May 15, 1956  C. F. ARENS ET AL  2,745,478
LIQUID FUEL SUPPLY SYSTEM WITH AUXILIARY RESERVE SUPPLY
Filed Sept. 30, 1950  2 Sheets-Sheet 1

INVENTORS
CECIL F. ARENS
BY STANLEY I. MACDUFF
Cecil F Arens
ATTORNEY

May 15, 1956     C. F. ARENS ET AL     2,745,478
LIQUID FUEL SUPPLY SYSTEM WITH AUXILIARY RESERVE SUPPLY
Filed Sept. 30, 1950     2 Sheets-Sheet 2

INVENTORS
CECIL F. ARENS
BY STANLEY I. MACDUFF

Cecil F. Arens
ATTORNEY

United States Patent Office 2,745,478
Patented May 15, 1956

2,745,478

LIQUID FUEL SUPPLY SYSTEM WITH AUXILIARY RESERVE SUPPLY

Cecil F. Arens and Stanley I. MacDuff, South Bend, Ind., assignors to Bendix Aviation Corporation, South Bend, Ind., a corporation of Delaware Application September 30, 1950, Serial No. 187,704

6 Claims. (Cl. 158—46.5)

This invention concerns apparatus for reserving a supply of fuel in the fuel tank of a vehicle.

It is an object of the invention to provide a mechanism to be associated with the gasoline tank on a vehicle for reserving a prescribed amount of gas in the tank to be withdrawn upon manipulation of a valve.

A further object of the invention resides in the provision of a device for reserving predetermined amount of fuel in the fuel tank of a vehicle.

A still further object of the invention is to maintain a reserve supply of fuel in the fuel tank of a vehicle, to be withdrawn at the will of the operator of the vehicle.

Another object of the invention is to provide a reserve fuel system for a vehicle, which utilizes the regular fuel tank and some of the pipe lines of the main fuel supply system.

A yet further object resides in the provision of a reserve fuel supply system for a vehicle wherein a signal apprises the operator that the reserve fuel supply is being used.

A very important object of the invention is to provide a fuel system which is automatically restored to normal operation after being operated on the reserve.

The above and other objects and features of the invention will be apparent from the following description of the apparatus taken in connection with the accompanying drawings which form a part of this specification, and in which.

Figure 1:
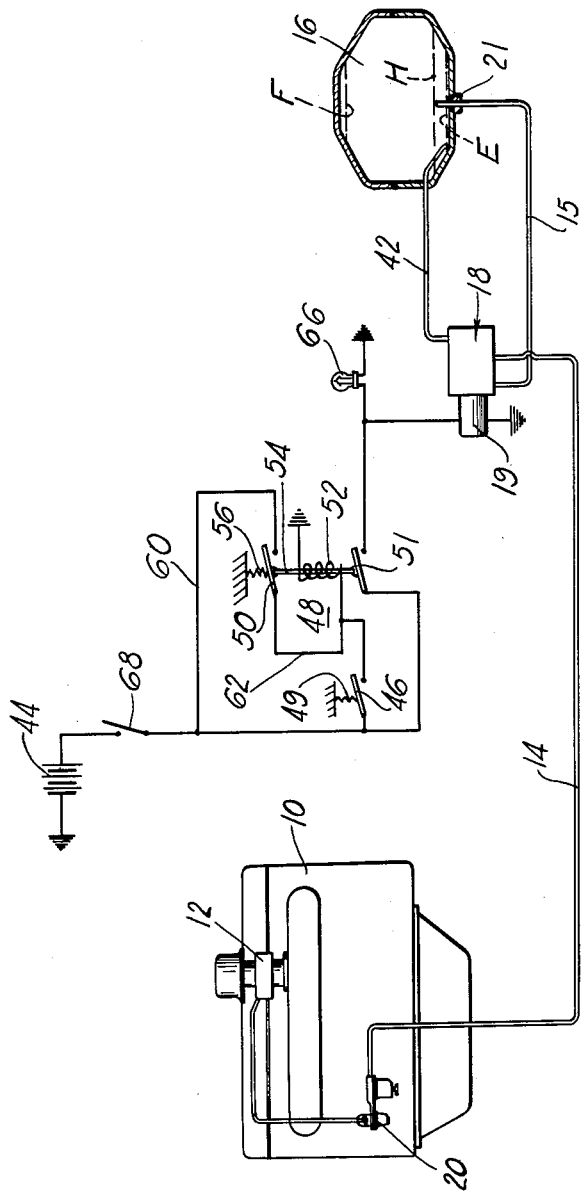
Figure 1 is a schematic representation of the reserve fuel supply system of the invention.

Referring now to Figure 1 of the drawings the reference numeral 10 designates an internal combustion engine, which is equipped with a carburetor 12, pipe lines 14 and 15, connecting the engine with a fuel supply tank 16 via valve 18, and a pump 20, for drawing the fuel out of the tank and forcing it into the carburetor 12. The end of pipe line 15 which extends into the fuel tank may be fixed thereto in any suitable manner, such as by fastening the same in the drain plug opening 21. The pipe lines 14 and 15 provide a main conduit for fuel between the tank and engine.

Figure 2:
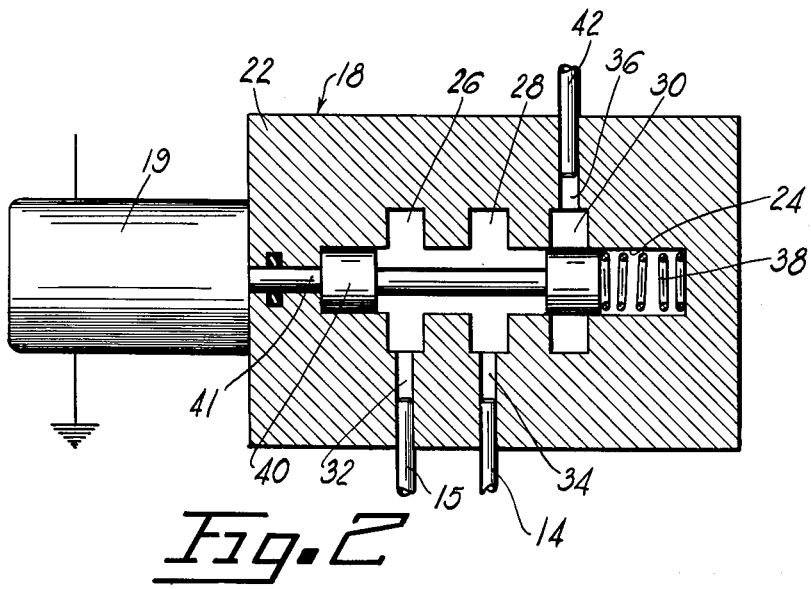
Figure 2 is a diagrammatic representation of one form of valve device used with the invention.

The valve 18 of Figure 2 is electrically controlled by a solenoid 19 and comprises a body 22, having a bore 24 therein provided with recesses 26, 28, and 30, with which passages 32, 34, and 36 respectively communicate. A spring 38, located in one end of the bore 24, normally biases a spool valve member 40 toward the other end of the bore. With the spool in this position fuel is supplied to the engine through the main fuel system. A rod member 41 is connected to the spool valve and extends into the solenoid 19. The passage 32 is in communication with the gas tank 16 via the pipe line 15; the passage 34 communicates with the carburetor via the pipe line 14. A conduit 42 connects the passage 36 with the fuel tank 16. The conduit 42 terminates on the bottom of the tank 16 so that all the fuel will be removed down to the level indicated at E. The pipe lines 14 and 42 provide an auxiliary conduit which connects the fuel tank with the engine. On the other hand pipe line 15 terminates above the bottom of the tank to preclude the removal of fuel beyond the level designated at H. The letter F represents a substantially full tank of fuel.

The amount of reserve fuel retained in the tank 16, that is, the level H, is determined by the height of pipe line 15 above the bottom of the tank. In most installations the adjustment of the pipe end 15 will be such that one gallon of fuel will remain in the tank when the fuel level has fallen to H. The reserve fuel supply in the tank is utilized by electrically manipulating valve 18, see Figures 1 and 3.

The electrical system includes the solenoid 19, energized by current from a battery 44, upon closing a normally open push button switch 46. This energizes relay 48, thus connecting the solenoid into the system. A tension spring 49 holds the push button switch 46 in open position. The relay 48 actuates switches 50 and 51, when current passes through coil 52, thus drawing armature 54 downwardly, and closing the switches against the force of tension spring 56, which normally holds the switches open. In order that the solenoid will remain energized when the push button switch 46 is released, the switch 50 is connected in parallel with the latter switch and to the coil 52 to thereby provide a holding circuit. Wires 60 and 62 connect the coil 52 to the source via the switch 50. A signal light 66 is connected in multiple with the solenoid 19 and lights only when the latter is energized, thus apprising the operator of the fact that the reserve supply of fuel is being used. The light 66 may be mounted on the vehicle dash, not shown, or in any other convenient place. The electrical system is energized through ignition switch 68. When the fuel level drops to H, the operator energizes the solenoid valve by pressing push button switch 46. The spool valve is forced to the right (see Figure 2) closing passage 32 and opening passage 36 thereby supplying fuel through the auxiliary fuel system.

Figure 3:
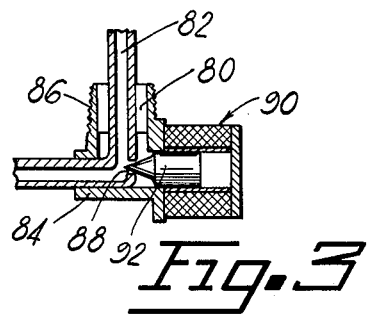
Figure 3 is a modified form of the device of the invention for maintaining a reserve supply of fuel in a tank.

Figure 3 illustrates a modified form of the valve and fuel tank attachment. In this version two conduits or passages 80 and 82 are concentrically arranged within the fuel tank and terminate in a body 84 mounted exteriorly of the tank. The outer conduit 80 is threaded at 86 for fastening to the bottom of the fuel tank 16. The outer conduit 80 communicates with the inner conduit 82 through an opening 88 controlled by a solenoid valve 90, having a valve member 92 normally closing said opening 88. The fuel in the tank flows through the inner conduit 82 until the level reaches H, at which time the operator energizes valve 90 to thereby unseat the valve member 92 from the opening 88, thus communicating the pipe line 14 with the fuel tank via the passage 80 of the outer conduit. This will allow the fuel to be reduced to the level E.

Obviously whenever the fuel in the tank 16 is reduced to level H, the fuel supply to the carburetor is shut off. It then becomes necessary to switch over to the reserve supply and this should be a reminder that there is only one gallon of fuel remaining in the tank. This amount of fuel is ample to reach a filling station, although several miles away, under normal driving conditions.

To reestablish the fuel system to the main supply turn off the ignition switch 68. Since most filling station attendants will not put gas in a car with the motor running, turning off the ignition switch, to stop the engine becomes a necessary operation before refilling with gas. This operation at the same time automatically returns the system to the main fuel supply lines.

The device is adapted for installation on existing vehicles as well as original equipment on new cars. When installed in the field on old cars the supply line is cut a few inches from the fuel tank to provide the lines 14 and 42 which are connected to the valve 18 as shown. The connection 15 is then run from the valve 18 to the fuel tank drain plug opening 21.

Although this invention has been described in connection with certain specific embodiments, the principles are susceptible of numerous other applications that will readily occur to persons skilled in the art.

Having thus described the various features of the invention, what we claim as new and desire to secure by Letters Patent is:

We claim:

1. In an engine fuel supply system, a fuel tank, first conduit means having an outlet adapted to be connected to an engine and an inlet connected to the fuel tank wherein the inlet is positioned at a first predetermined level above the bottom of the tank, second conduit means having an outlet adapted to be connected to an engine and an inlet connected to the fuel tank wherein the inlet is positioned at a second predetermined level which is below said first level, valve means in said conduit means operative to selectively permit flow through said second conduit means and electrical means for controlling said valve means and including an electrical power circuit for actuating said valve means to permit flow through said second conduit means when said circuit is energized, a normally open magnetic switch in the circuit, a control circuit for said magnetic switch, a manually operated switch in the control circuit for energizing said magnetic switch to cause it to close, and a second manually-operated switch in the control circuit for de-energizing said magnetic switch to cause it to open.

2. In an engine fuel supply system, a fuel tank, first conduit means having an outlet adapted to be connected to an engine and an inlet connected to the fuel tank wherein the inlet is positioned at a first predetermined level above the bottom of the tank, second conduit means having an outlet adapted to be connected to an engine and an inlet connected to the fuel tank wherein the inlet is positioned at a second predetermined level which is below said first level, valve means in said conduit means operative to selectively permit flow through said second conduit means, magnetic means for actuating said valve means to permit flow through said second conduit means when said magnetic means is energized, and an electrical circuit for controlling said magnetic means including a normally open switching device, second magnetic means in said circuit for closing said switching device, a normally open manually operated switch in the circuit for energizing said second magnetic means, and a second switch in parallel with said manually operated switch, said second switch being closed upon energization of the second magnetic means to hold the same energized after release of the manually operated switch.

3. In an engine fuel supply system, a fuel tank, first conduit means having an outlet adapted to be connected to an engine and an inlet connected to the fuel tank wherein the inlet is positioned at a first predetermined level above the bottom of the tank, second conduit means having an outlet adapted to be connected to an engine and an inlet connected to the fuel tank wherein the inlet is positioned at a second predetermined level which is below said first level, a valve in the system normally establishing communication through the first conduit means and cutting off communication through the second conduit means, electrical means for controlling said valve and including magnetic means for actuating said valve to permit flow through said second conduit means when said magnetic means is energized, and a control circuit for said magnetic means including an electrically operated normally open switching device, a first switch in the circuit for selectively closing said switching device to cause energization of the magnetic means, and a second switch in the circuit for opening said switching device.

4. In combination with an engine, a fuel system for said engine including a fuel tank, means connecting the tank to the engine for supplying fuel to the latter, said last named means including connections to the tank at first and second levels, a valve in the connections having a first position which allows removal of fuel from the tank to said first level and a second position which allows removal of fuel to said second level, means for holding said valve in its first position, and an electrical system for moving said valve to its second position, said system including magnetic means for actuating said valve, an electrically operated switching device for controlling said magnetic means, a control circuit for said switching device including a first switch in the circuit for closing said switching device, and a second switch in the circuit for opening said switching device.

5. In combination with an engine, a fuel system for the engine including a fuel tank, means connecting the tank to the engine for supplying fuel to the latter, said last named means including connections to the tank at first and second levels, a solenoid valve in the connections normally biased to a first position which allows removal of fuel from said tank to the first level, said valve being movable to a second position which allows removal of fuel to the second level, a power source for said solenoid valve, an electrical connection between the power source and the solenoid valve, and a circuit for controlling the valve position comprising an operator operated switch, a relay energizable upon closing said operator operated switch, a pair of switches closable upon energization of said relay, one of the switches of said pair being in said electrical connection and the other switch of said pair being in parallel with the operator operated switch, and a second operator operated switch in the circuit for de-energizing the relay.

6. In combination with an engine having an ignition system including an ignition switch, a fuel system for the engine comprising a fuel tank, means connecting the tank to the engine for supplying fuel to the latter, said last named means including connections to the tank at first and second levels, an electrically actuated valve in the connections normally urged to a first position which allows the removal of fuel from said tank to the first level and movable to a second position which allows removal of fuel to the second level, an electrical power source operatively connected to said valve for urging the same from its first to its second position, an electrical circuit for controlling the aforesaid movement of the valve comprising an operator operated switch in the circuit, a relay energizable upon closing said last named switch, a pair of switches closable upon energization of said relay, one of the switches of said pair being in the connection between said power source and said valve, the other switch of said pair being in parallel with said operator operated switch to thereby insure energization of the relay when said operator operated switch is open, and means automatically conditioning the system for lowering the fuel to the first level including a switch in said circuit operatively associated with said engine ignition switch and actuable upon turning off the engine ignition to thereby de-energize the relay.

References Cited in the file of this patent

UNITED STATES PATENTS

| | | |
|---|---|---|
| 1,095,016 | McDevitt | Apr. 28, 1914 |
| 1,359,336 | Crell | Nov. 16, 1920 |
| 1,548,363 | Horst | Aug. 4, 1925 |
| 1,535,565 | Bitman | Apr. 28, 1925 |
| 2,125,674 | Gould | Aug. 2, 1938 |
| 2,411,178 | Fiedler | June 1, 1943 |
| 2,531,847 | Haley | Nov. 28, 1950 |

FOREIGN PATENTS

| | | |
|---|---|---|
| 386,923 | Germany | Dec. 19, 1923 |